(12) United States Patent
Penner

(10) Patent No.: US 6,553,935 B1
(45) Date of Patent: Apr. 29, 2003

(54) PET AIR BED

(76) Inventor: Tim Penner, 3634 N. Sapphire, Mesa, AZ (US) 85215

( * ) Notice: Subject to any disclaimer, the term of this patent is extended or adjusted under 35 U.S.C. 154(b) by 0 days.

(21) Appl. No.: 10/161,016

(22) Filed: Jun. 1, 2002

(51) Int. Cl.[7] .................. A01K 29/00; A47C 27/00
(52) U.S. Cl. ........................... 119/28.5; 5/423
(58) Field of Search ............... 119/28.5; 5/413 AM, 5/421, 423

(56) References Cited

U.S. PATENT DOCUMENTS

| | | | | |
|---|---|---|---|---|
| 2,913,833 A | * | 11/1959 | Glintz ............................ | 5/421 |
| 4,064,835 A | * | 12/1977 | Rabenbauer ................. | 119/28.5 |
| D256,734 S | * | 9/1980 | Riley ........................... | 119/28.5 |
| 5,311,837 A | * | 5/1994 | Mamer-Boellstorff ...... | 119/28.5 |
| 6,189,487 B1 | * | 2/2001 | Owen et al. ................ | 119/28.5 |
| 6,237,531 B1 | * | 5/2001 | Peeples et al. ............. | 119/28.5 |
| 6,305,317 B1 | * | 10/2001 | Spiegel ....................... | 119/28.5 |
| 6,473,920 B2 | * | 11/2002 | Augustine et al. ............. | 5/423 |

* cited by examiner

*Primary Examiner*—Charles T. Jordan
*Assistant Examiner*—Elizabeth Shaw
(74) *Attorney, Agent, or Firm*—Joseph N. Breaux

(57) ABSTRACT

A pet air bed that includes a plastic housing having a base portion and an elevated pet support portion hingedly connected to the base portion and having a number of air flow holes provided through pet support and/or pet adjacent surfaces thereof; a fan assembly being connected to the plastic housing in a manner such that air flow from the exterior of the plastic housing is generated into a cavity within the plastic housing in a manner to cause air to flow out through the air flow holes in the elevated pet support portion; the cavity formed within the plastic housing is provided for positioning cooling or heating elements such that the pet may have a temperature controlled pet bed; a forward section of the plastic housing including clips for holding a name tag or other pet identifying type of plate.

1 Claim, 3 Drawing Sheets

PET AIR BED

TECHNICAL FIELD

The present invention relates to pet accessories and more particularly to a pet air bed that includes a plastic housing having a base portion and an elevated pet support portion hingedly connected to the base portion and having a number of air flow holes provided through pet support and/or pet adjacent surfaces thereof; a fan assembly being connected to the plastic housing in a manner such that air flow from the exterior of the plastic housing is generated into a cavity within the plastic housing in a manner to cause air to flow out through the air flow holes in the elevated pet support portion; the cavity formed within the plastic housing is provided for positioning cooling or heating elements such that the pet may have a temperature controlled pet bed; a forward section of the plastic housing including clips for holding a name tag or other pet identifying type of plate.

BACKGROUND ART

Many individuals would like to provide a temperature controlled location for their pet to lay during inclimate weather. It would be desirable, therefore, to have a pet bed that included an air circulating mechanism for circulating air over and around the pet such that the pet would receive a temperature controlling benefit.

GENERAL SUMMARY DISCUSSION OF INVENTION

It is thus an object of the invention to provide a pet air bed that includes a plastic housing having a base portion and an elevated pet support portion hingedly connected to the base portion and having a number of air flow holes provided through pet support and/or pet adjacent surfaces thereof; a fan assembly being connected to the plastic housing in a manner such that air flow from the exterior of the plastic housing is generated into a cavity within the plastic housing in a manner to cause air to flow out through the air flow holes in the elevated pet support portion; the cavity formed within the plastic housing is provided for positioning cooling or heating elements such that the pet may have a temperature controlled pet bed; a forward section of the plastic housing including clips for holding a name tag or other pet identifying type of plate.

Accordingly, a pet air bed is provided. The pet air bed includes a plastic housing having a base portion and an elevated pet support portion hingedly connected to the base portion and having a number of air flow holes provided through pet support and/or pet adjacent surfaces thereof; a fan assembly being connected to the plastic housing in a manner such that air flow from the exterior of the plastic housing is generated into a cavity within the plastic housing in a manner to cause air to flow out through the air flow holes in the elevated pet support portion; the cavity formed within the plastic housing is provided for positioning cooling or heating elements such that the pet may have a temperature controlled pet bed; a forward section of the plastic housing including clips for holding a name tag or other pet identifying type of plate.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
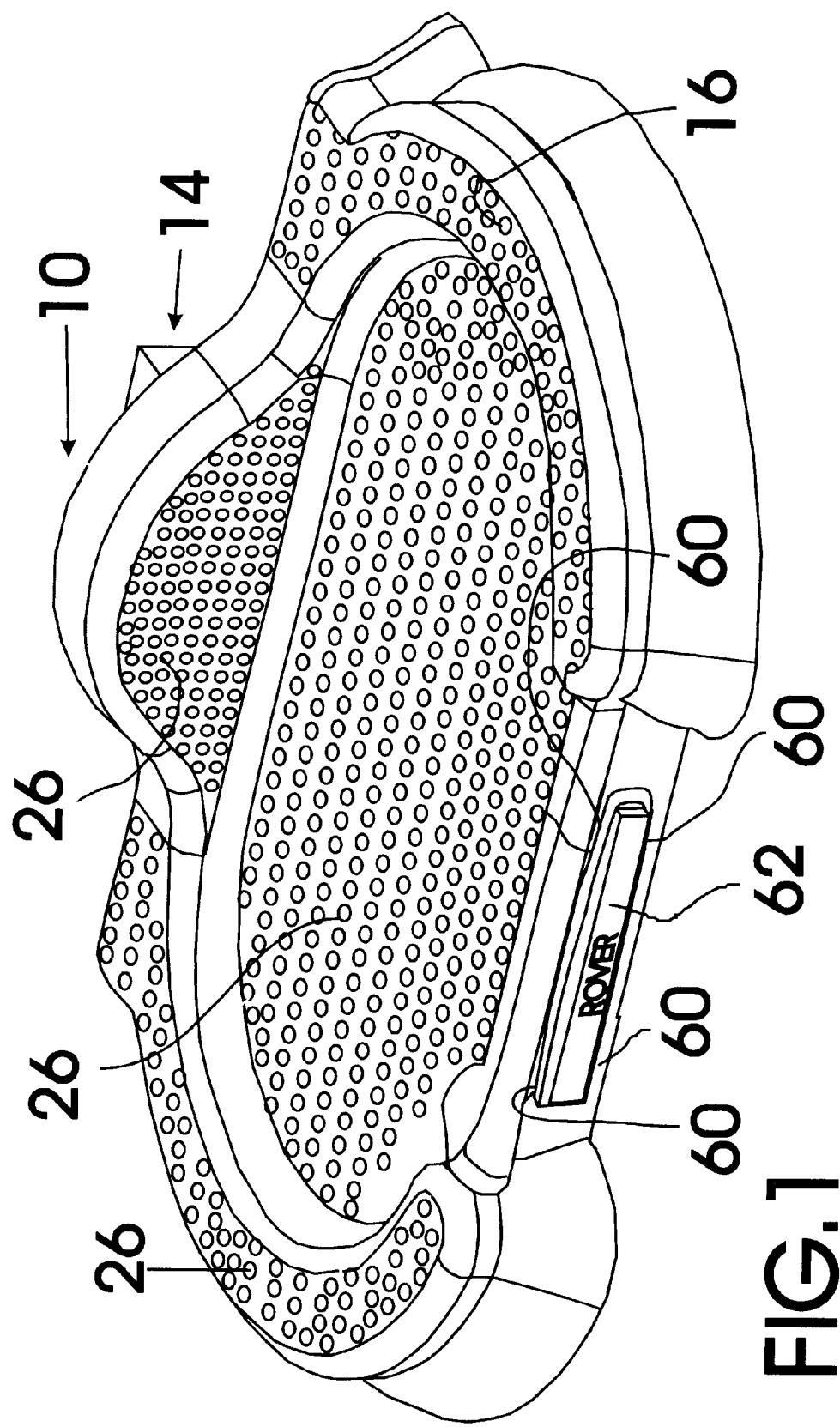
FIG. 1 is a perspective view of an exemplary embodiment of the pet air bed of the present invention.
Figure 2:
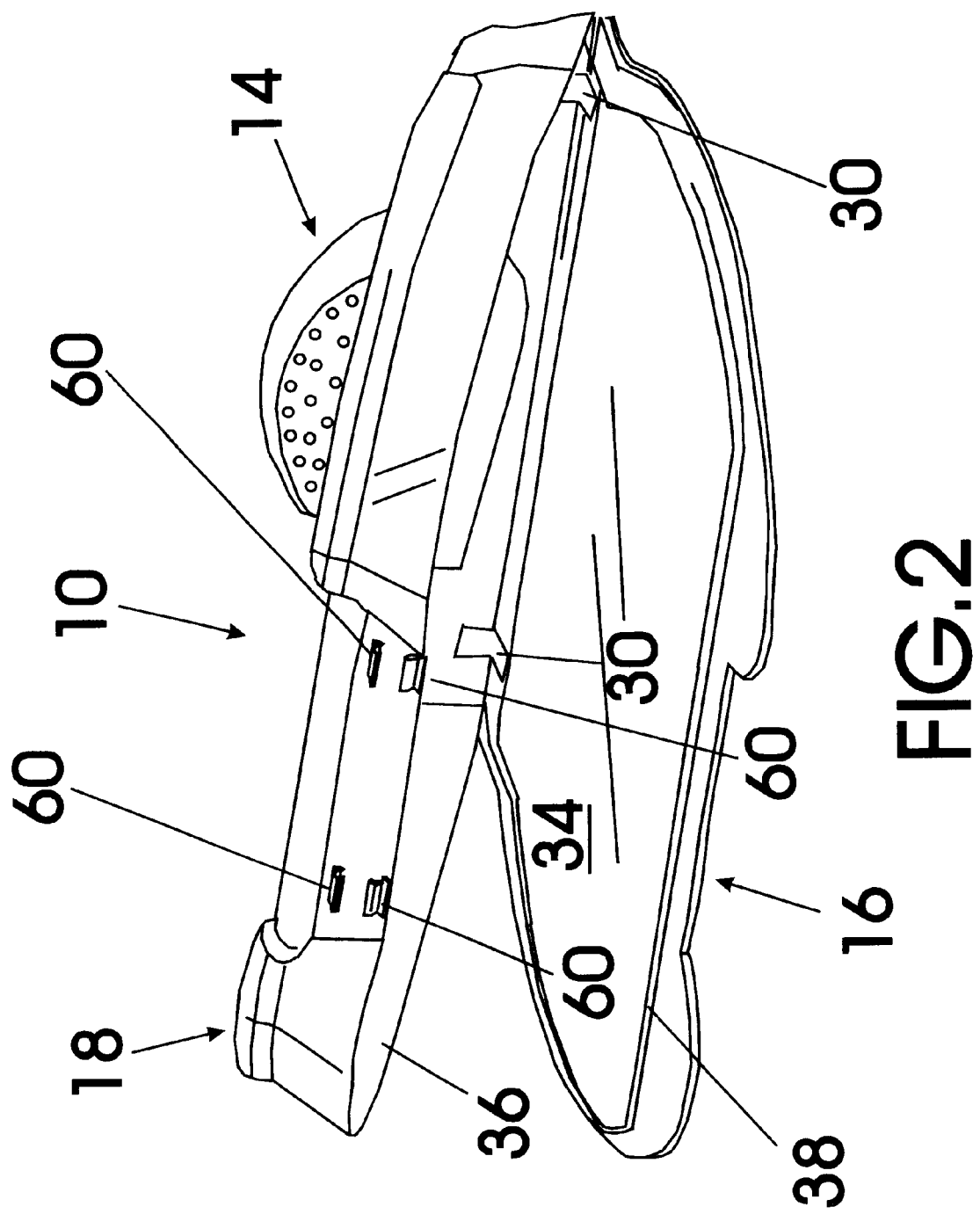
FIG. 2 is a perspective view showing the top pet support portion pivoted upward from the base portion of the housing.
Figure 3:
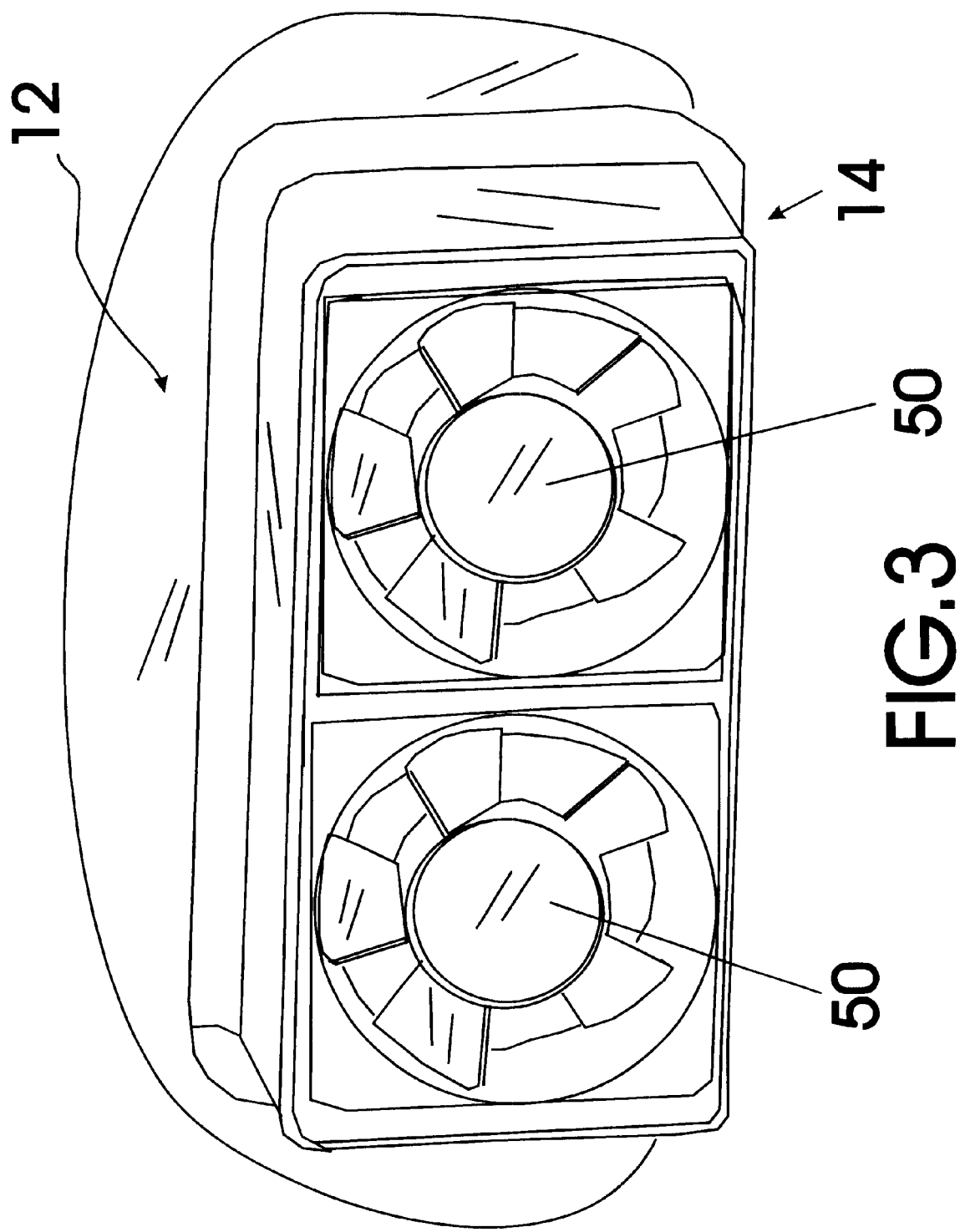
FIG. 3 is a detailed perspective view of the fan assembly that is attached to the back of the pet support portion of the housing.

FIGS. 1–3 show various aspects of an exemplary embodiment of the pet air bed of the present invention generally designated 10. Pet air bed 10 includes a plastic housing generally designated 12 and a fan assembly generally designated 14 that is rigidly connected to plastic housing 12.

Plastic housing 12 includes a base portion generally designated 16 and an elevated pet support portion generally designated 18 that includes a number of air flow holes 26 in various sections thereof which are either in contact with or adjacent to a pet supported on the pet air bed 10. Elevated pet support portion 18 is connected to base portion 16 by hinges 30 such that a user may position cooling ice packs or heat generated packs within a cavity 34 that is formed when elevated pet support portion 18 is pivoted downward in a manner such that a forward edge 36 of elevated pet support portion 18 is in connection with a forward edge 38 of base portion 16.

In this exemplary embodiment fan assembly 14 includes two electrical or battery powered fans each generally designated 50 that are positioned adjacent to each other and which draw air from the exterior of plastic housing 12 and then blow the air through cavity 34 and out through air flow holes 26. Also in this embodiment, a forward section of the plastic elevated pet support portion 18 is provided with four clips 60 that maybe used to attach a name plate 62 or other plate containing other identifying information.

It can be seen from the preceding description that a pet air bed has been provided.

It is noted that the embodiment of the pet air bed described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A pet air bed comprising:

a plastic housing having a base portion and an elevated pet support portion hingedly connected to the base portion and having a number of air flow holes provided through pet support and/or pet adjacent surfaces thereof; and a fan assembly being connected to the plastic housing in a manner such that air flow from the exterior of the plastic housing is generated into a cavity within the plastic housing in a manner to cause air to flow out through the air flow holes in the elevated pet support portion;

the cavity formed within the plastic housing being provided for positioning cooling or heating elements such that a pet may have a temperature controlled pet bed;

a forward section of the plastic housing including clips for holding a name tag or other pet identifying type of plate.

* * * * *